US010424061B2

(12) United States Patent
Krueger et al.

(10) Patent No.: US 10,424,061 B2
(45) Date of Patent: Sep. 24, 2019

(54) METHOD FOR ASSIGNING TISSUE NORMALIZATION FACTORS FOR DIGITAL IMAGE ANALYSIS

(71) Applicant: Flagship Biosciences, Inc., Westminster, CO (US)

(72) Inventors: Joseph Krueger, Westminster, CO (US); Nathan T. Martin, Westminster, CO (US)

(73) Assignee: Flagship Biosciences, Inc., Westminster, CO (US)

( * ) Notice: Subject to any disclaimer, the term of this patent is extended or adjusted under 35 U.S.C. 154(b) by 197 days.

(21) Appl. No.: 15/448,550

(22) Filed: Mar. 2, 2017

(65) Prior Publication Data

US 2017/0270660 A1    Sep. 21, 2017

Related U.S. Application Data

(60) Provisional application No. 62/302,268, filed on Mar. 2, 2016.

(51) Int. Cl.
*G06K 9/00*    (2006.01)
*G06T 7/00*    (2017.01)

(52) U.S. Cl.
CPC .. *G06T 7/0012* (2013.01); *G06T 2207/30024* (2013.01); *G06T 2207/30096* (2013.01)

(58) Field of Classification Search
CPC ......... G06T 2207/30096; G06T 7/0012; G06T 2207/30024
See application file for complete search history.

(56) References Cited

U.S. PATENT DOCUMENTS

| 9,248,313 B2 | 2/2016 | Weibrecht et al. |
| 2012/0219206 A1 | 8/2012 | Janowczyk |
| 2013/0116511 A1* | 5/2013 | Sui .......................... G06F 19/24 600/300 |
| 2014/0329724 A1 | 11/2014 | George et al. |
| 2015/0119708 A1 | 4/2015 | Sachse et al. |

FOREIGN PATENT DOCUMENTS

| RU | 2419798 | 5/2011 |
| RU | 2482793 | 5/2013 |
| WO | WO2011146928 | 11/2011 |

* cited by examiner

*Primary Examiner* — Tom Y Lu
(74) *Attorney, Agent, or Firm* — Josiah Barbour

(57) ABSTRACT

Staining of tissue is a common approach utilized to visualize a gene product in tissue context. In certain applications, it is necessary to report a sum of events within the tissue as a specific function of the target tissue area, which is a sub-area of the total tissue, as a normalization factor for reporting the quantification. Here, we describe methods of determining target tissue area and reporting a quantification which is ratiometric to the target tissue area, utilizing computer algorithms. It is important to assign a value for the "target tissue area" in scenarios where a tissue area normalization factor is needed in the most pathologically relevant fashion during the application of tissue image analysis. We have created methods for determining and reporting "target tissue area" as normalization factor which are useful in diagnostic applications utilizing image analysis.

20 Claims, 10 Drawing Sheets

IMAGE OF STAINED SLIDE

STAIN DEFINES TISSUE AREA

TISSUE AREA INCLUSION - STAIN

TISSUE AREA INCLUSION - CRITERIA 1

TISSUE AREA INCLUSION - CRITERIA 1

TISSUE AREA INCLUSION - CRITERIA 1

Example A: Tumor epithelium is target tissue

Example B: Tumor Micro-Environment (TME) is target tissue

Classified Cells

Dark cells = target cells
Light cells= non-target cells

Target Tissue Area
(Sum of all cells)

Delivers Target Tissue Area output
based on number and size of cells

Area of Target Tissue
Within Perimeter

Delivers Target Tissue Area output
based on outline of classified cells

METHOD FOR ASSIGNING TISSUE NORMALIZATION FACTORS FOR DIGITAL IMAGE ANALYSIS

CROSS-REFERENCE TO RELATED APPLICATION

This application claims benefit of priority with U.S. Provisional Application Ser. No. 62/302,268, filed Mar. 2, 2016, titled "METHOD FOR ASSIGNING TISSUE NORMALIZATION FACTORS FOR DIGITAL IMAGE ANALYSIS", the contents of which are hereby incorporated by reference.

BACKGROUND

Field of the Invention

This application relates generally to methods for image analysis of tissue sections. More specifically, this application relates to deriving a normalization value for quantification of biomarker expression in tissues evaluated with a tissue-based assay based on tissue area determined by digital image analysis of said tissues.

Description of the Related Art

Histologic evaluation of biomarker expression levels in tissue often requires normalization to a value which captures the context of the tissue. For example, the frequency of biomarker-positive cells can be determined relative to the total number of cells contained within a tissue section. Similarly, scoring paradigms such as the H-score are structured to evaluate staining intensity (i.e., a graded 0, 1, 2, 3+ scheme) with normalization to the frequency of cells expressing the biomarker at each level.

Methods to determine tissue area for manual scoring paradigms have been limited to scoring schemes which evaluate a small portion of a sample (e.g., high powered field), and are limited in their ability to exclude area which is not tissue (e.g., clear glass exposed when a tissue tears in an area) or when there is a staining or histology artifact present and the region should be excluded from analysis.

Digital image analysis tools enable processing of whole slide images of tissues in a single analysis. Current image analysis tools determine tissue area based upon assessment of individual pixels rather than assessment of tissue objects or by the local area features of multiple pixels or non-tissue object clusters of pixels.

Often, these tools can define a tissue area based on the placement of manual annotations which specify the tissue regions for analysis. While the area within the annotation is easily calculated by the tools which enable the annotation, the annotation often includes area that is not constituted of target tissue (e.g., empty space, vasculature, stroma, etc.). Therefore, there is a need to establish the effective area of tissue relevant to the analysis. Most current tools can determine tissue area by defining a color, or color intensity threshold, which distinguishes clear glass area from that occupied by the tissue section. Similar to manual scoring, these methods are typically unable to accurately distinguish between tissue objects (e.g., cells, vacuoles, airways) which may or may not contribute to overall tissue area. Furthermore, current methods do not enable definition of tissue area based on classification of tissue objects (e.g., vessels, airways, glands), classified tissue object clusters (e.g., tumor cell nests), pixel neighborhood features, or non-tissue object clusters of pixels (e.g., pixels evaluated relative to their neighborhood).

FIG. 1 provides an illustrative example of current tissue area quantification approaches whereby tissue area is determined by areas of staining above background or clear area, which is defined based on individual pixel intensity values for an IHC stain. In this example, the tissue area of interest contains tumor epithelium and TME tissue compartments where it is of interest to assess biomarker expression in each tissue compartment individually (FIG. 1A). The typical approach applied by current methodologies utilizes a threshold based on pixel intensities for the defined color to differentiate tissue area from clear glass area. FIGS. 1B and 1C illustrate the result of this image segmentation to determine tissue area whereby two different thresholds for the pixel intensities are set. This approach provides a tissue area value which does not capture tissue area in the context (e.g., tumor tissue area vs. TME tissue area) of the tissue compartments of interest for analysis.

FIG. 2 provides another example of the prior art whereby a histologic stain is retained preferentially in tumor epithelium cells. This staining can be specific or non-specific for a particular analyte. In this example, tissue area can be defined based on pixel intensities of the histologic stain above a defined threshold and in the context of the surrounding pixel neighborhood. FIG. 2A illustrates the brightfield image of the tissue section stained with two histologic stains (i.e., hematoxylin and DAB) and FIG. 2B illustrates the algorithm-based isolation of the DAB stain. The pixel intensities of the DAB stain are evaluated, and FIG. 2C illustrates a typical identification of tissue area based upon simple segmentation of individual pixel intensities. In FIG. 2C, the black outline indicating those regions with individual pixel intensities above threshold includes many gaps or holes within the tumor epithelium area, and includes regions of TME tissue area which are above threshold for individual pixels which would be considered non-target tissue. FIGS. 2D-F illustrate the incorporation of pixel neighborhood features to define tissue area. FIG. 2D illustrates the tumor tissue area (dark mark-up) without minimal accounting for pixel neighborhood, and the resulting tissue area definition by this approach is similar to that of conventional approaches. In FIGS. 2E and 2F, however, additional neighborhood features (e.g., define regions based on clusters of above threshold features, define minimum region size, define minimum number of positive pixels needed for tissue area) are evaluated which results in increasingly accurate detection and evaluation of tumor epithelium tissue area only (dark mark-up) and accounts for local variability and heterogeneity in DAB staining.

SUMMARY

In accordance with the embodiments herein, methods for digitally determining tissue area as a normalizing value for use in evaluating biomarker expression (e.g., biomarker-positive cells/mm2) are described. The methods go far beyond current art by enabling determination of tissue area using tissue object morphometric, staining, and localization features extracted by an algorithm process. These image analysis features describing the tissue in an image analysis feature space are processed to determine tissue object class, or clusters of similarly classified objects, and the morphometric and location features of the objects of interest are summarized to define tissue area.

Staining of tissue by immunohistochemistry (IHC) or immunofluorescence (IF) is a common approach utilized to visualize a gene product in tissue context. A common approach for reporting a quantification of a stain is to report a ratio of graded staining as a percentage of the total tissue area within the tissue section. However, in certain applications, it is necessary to report a sum of events within the tissue as a specific function of the target tissue area which is a sub-area of the total tissue (such as the number of a specific cell type per area of target tissue). Here, the target tissue area is utilized as a normalization factor for reporting the quantification as a summary value which can be compared to other samples. Herein are described methods of determining target tissue area and reporting a quantification of said target tissue area utilizing computer algorithms to perform tissue image analysis of whole slide image of tissue sections stained by IHC, chromogenic in-situ hybridization (CISH), fluorescent in-situ hybridization (FISH), or IF and other in situ methods, where the tissue area is constrained to a specific type of target tissue within the tissue section. During the application of tissue image analysis, the definition of this "target tissue area" is a function of the methods utilized for interpreting of the image, and is thus dependent on the methodology used. Because it is important to assign a value for the "target tissue area" in scenarios where a tissue area normalization factor needed in the most pathologically relevant fashion, we have created methods for determining and reporting "target tissue area" as normalization factor which are useful in diagnostic applications utilizing image analysis.

DETAILED DESCRIPTION OF EMBODIMENTS

Figure 1A:
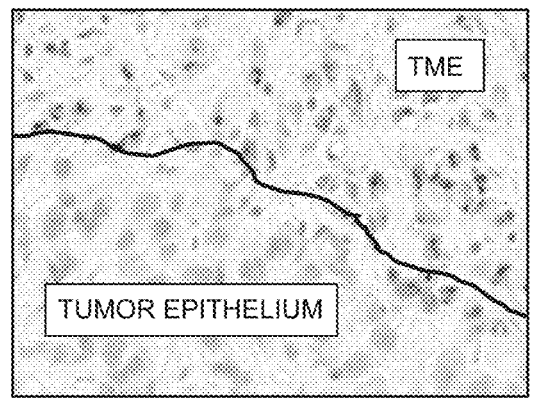
FIGS. 1(A-C) illustrate examples of conventional tissue area quantification approaches whereby tissue area is determined by areas of staining above background or clear area, which is defined based on individual pixel intensity values for an IHC stain.
Figure 1B:
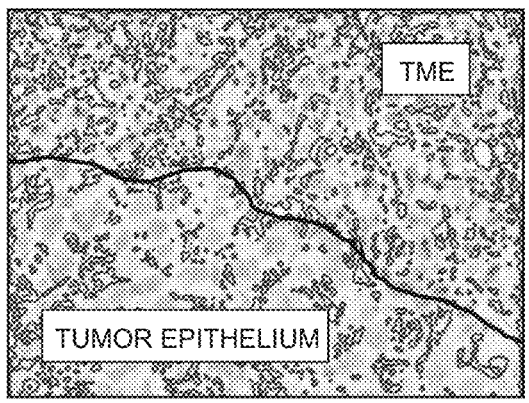
Figure 1C:
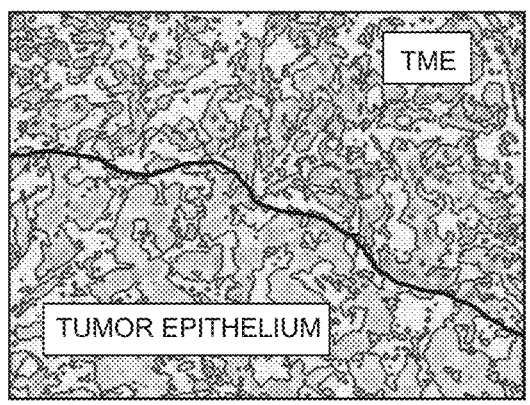
Figure 2A:
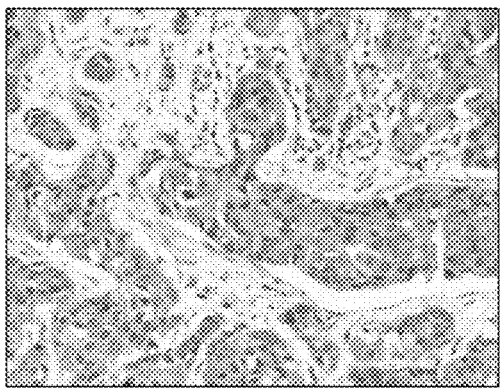
FIGS. 2(A-F) illustrate the prior art whereby a histologic stain is retained preferentially in tumor epithelium cells.
Figure 2B:
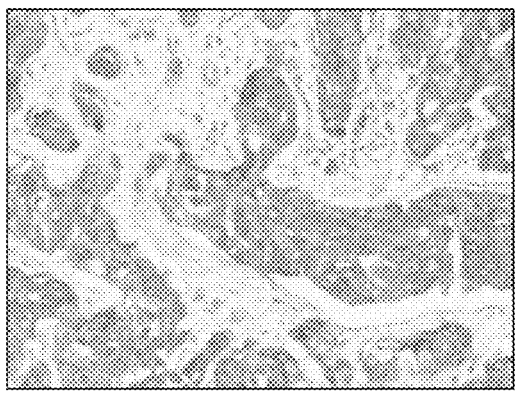
Figure 2C:
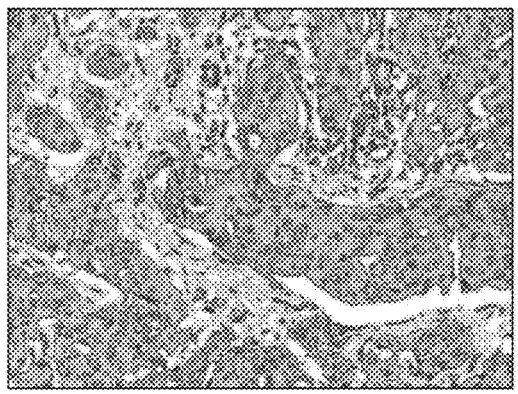
Figure 2D:
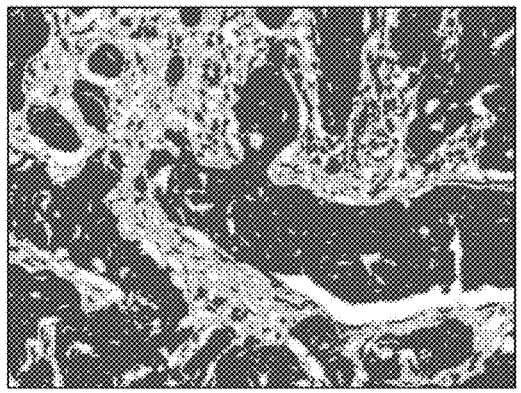
Figure 2E:
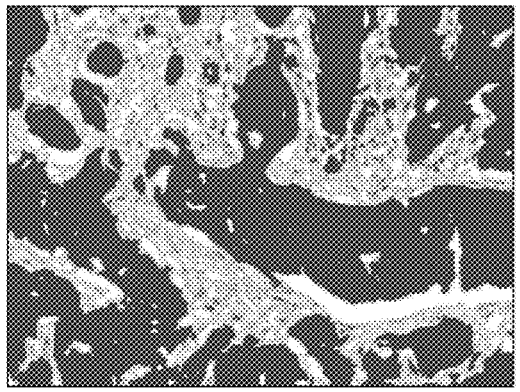
Figure 2F:
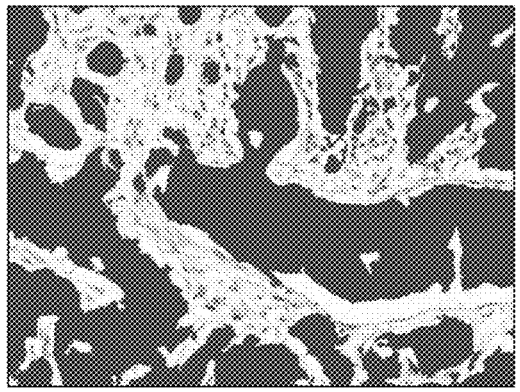

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions without departing from the spirit and scope of the invention.

For purpose of definition, a tissue object is one or more of a cell (e.g., immune cell), cell sub-compartment (e.g., nucleus, cytoplasm, membrane, organelle), cell neighborhood, a tissue compartment (e.g., tumor, tumor microenvironment (TME), stroma, lymphoid follicle, healthy tissue), biomarker, blood vessel, and a lymphatic vessel. Tissue objects are visualized by histologic stains which highlight the presence and localization of a tissue object. Tissue objects can be identified directly by stains specifically applied to highlight said tissue object (e.g., hematoxylin to visualize nuclei, IHC stain for a protein specifically found in a muscle fiber membrane), indirectly by stains applied which non-specifically highlight the tissue compartment (e.g., DAB background staining), or are biomarkers known to be localized to a specific tissue compartment (e.g., nuclear-expressed protein, carbohydrates only found in the cell membrane).

For the purpose of this disclosure, tissue-based assay refers to an assay modality which enables evaluation of biomolecule or biomarker expression/quantity in tissue samples while retaining tissue architecture. A tissue-based assay enables evaluation of tissue objects (e.g., cells) for biologic molecules (e.g., chromatin, biomarkers) relative to position (e.g., x-y coordinates, polar coordinates) in the tissue. For example, and not limitation, tissue-based assays of relevance to this invention can be IHC, IF, CISH, FISH, and mass spectrometry imaging (MSI) methods. These methods retain overall tissue architecture and enable the evaluation of biomolecules relative to underlying tissue objects of the sample relative to position in the tissue.

For the purpose of this disclosure, patient status includes diagnosis of disease state, disease severity, disease progression, and therapy efficacy. Other patient statuses are contemplated.

In an illustrative embodiment, the method may generally comprise seven consecutive steps, including: (i) obtaining one or more images of tissues processed with a tissue-based assay; (ii) applying an algorithm process to extract the morphometric, staining, and location features of tissue objects; (iii) storing said extracted features to generate a data array representing the one or more tissues in image analysis feature space; (iv) selecting one or more tissue object of interest; (v) evaluating one or more morphometric features of said one or more tissue object of interest to define tissue area; (vi) summarizing said one or more morphometric features to derive tissue area for the analysis area of interest; and (vii) normalizing one or more summary value of biomarker staining in a tissue to the derived tissue area value.

Tissue samples for evaluation are generated using standard processes and practices pertaining to IHC, IF, CISH, FISH, and MSI to produce tissue sections which can be evaluated for one or more biomarker or tissue feature. One or more biomarker or tissue feature of interest may be highlighted by one of the above-mentioned assay modalities in each tissue section (i.e., mono- and multiplexed assay formats) or on multiple sections from a tissue specimen (e.g., one biomarker per serial section for a single patient).

Digitization, using standard practices (i.e., digital slide scanning, imaging with a digital camera mounted on a microscope, MSI, etc.), is performed to generate a real (e.g., brightfield image from an IHC-stained tissue) or false image (e.g., color stack from IF-stained tissue, molecule expression stack from MSI evaluated tissue, etc.) of the tissue which will be utilized for visualization of the tissue for the biomolecules and features of interest as well as downstream analysis. The digital images of each patient tissue sample(s) are stored in computer memory or in a database for future recall and analysis.

In an embodiment of this invention, a digital tissue image analysis algorithm implemented by a computer is applied to each image of a tissue specimen assayed with a tissue-based test to extract the morphometric, staining, and location features pertaining to tissue objects in each image. This process results in the transformation of the physical tissue into a dataset that associates a quantity of a specific analyte or biomolecule at a specific location in a tissue object in the tissue section.

Morphometric features pertain to the size, shape, area, texture, organization, and organizational relationship of tissue objects observed in a digital image. For example, and not limitation, morphometric features can be the area of a cell nucleus, the completeness of biomarker staining in a cell membrane, the diameter of a cell nucleus, the roundness of a blood vessel, lacunarity of biomarker staining in a nucleus, etc.

Staining features pertain to the stain appearance, stain intensity, stain completeness, stain shape, stain texture, and stain area of specified IHC, ISH, and IF stains or dyes or amount of a molecule determined by MSI-based methodologies.

Localization features pertain to the location of tissue objects within a tissue section. Location can be determined based on an absolute (e.g., x and y location, μm from center of image) or relative (e.g., x and y position of cells relative to a tissue feature of interest such as a vessel, polar coordinates referenced to the center of mass of a tumor nest) coordinate system (e.g. x-y-z coordinates, polar coordinates). Location for specific image objects can be defined as the centroid of the object or any position enclosed by the object extending from the centroid to the exterior limits of the object. Localization features are generally the position of a feature in the tissue section, the spatial relationships of tissue objects relative to each other, and the relationship of feature measurements between differential objects in the tissue section.

The image analysis algorithm implemented by a computer extracts the morphometric, staining, and location features for each tissue object of interest within an image and stores said values for further analysis in computer memory or to a database.

Figure 3:
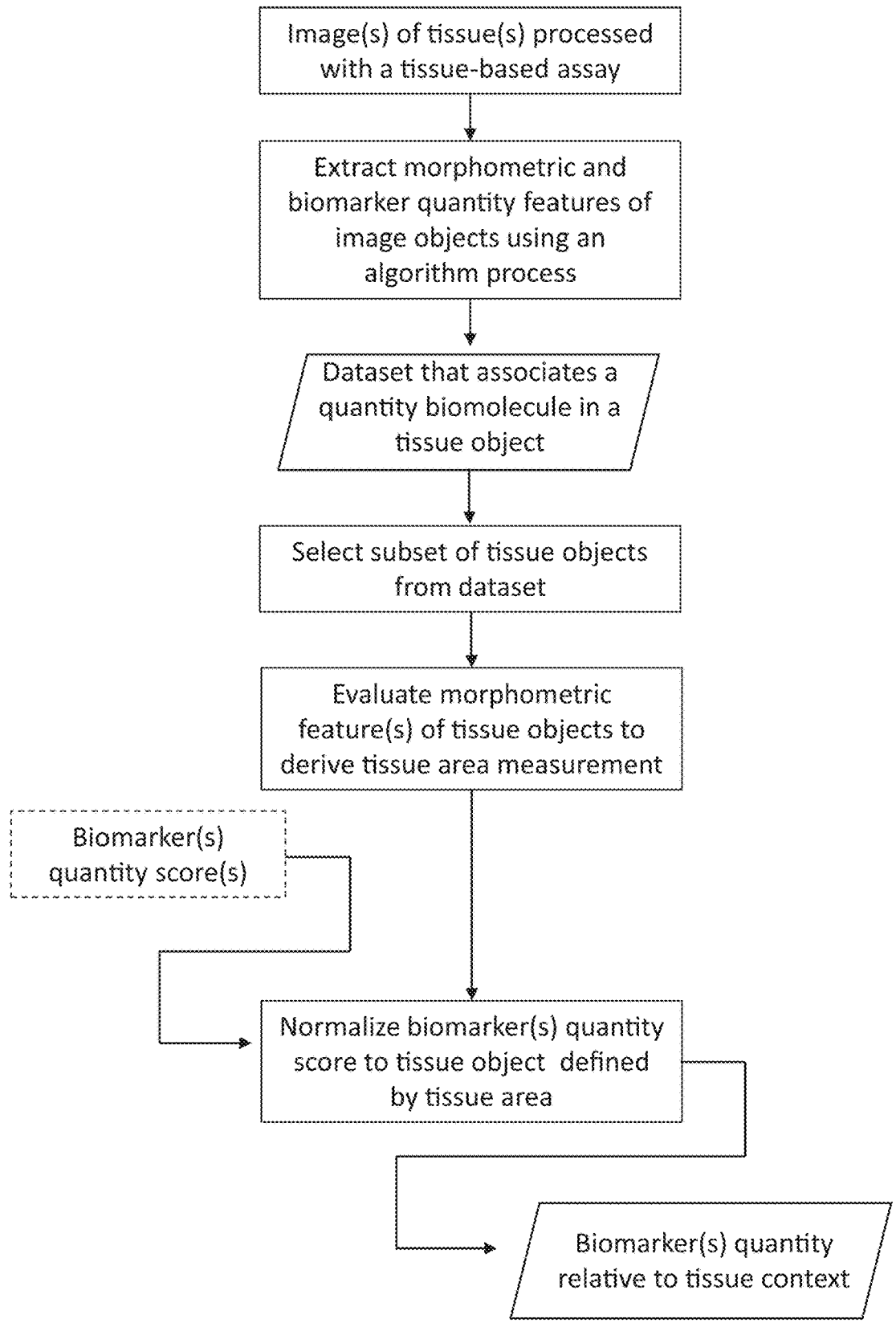
FIG. 3 shows a method for assigning tissue normalization factors for digital image analysis.

One example of this method is illustrated in FIG. 3. In this embodiment, one or more tissues from a specimen are assayed with a tissue-based test and digitized to produce digital images of the tissue sections. An algorithm process implemented by a computer is applied to the images to extract the morphometric, staining, and localization features for tissue objects. These features are stored to a database resulting in a transformation of the one or more tissue sections into a dataset that associates a quantity of a specific analyte or biomolecule at a specific location in a tissue object in the tissue section. Optionally, a subset of tissue objects can be selected based on their classification (e.g., tumor cell, stroma cell) derived from their representation in image analysis feature space and used to define the regions of the image for which tissue area will be determined. One or more morphometric features of all, or the selected subset (s) of, tissue objects are evaluated to derive a tissue area measurement based on one or more features. This evaluation results in a summary value which is the tissue area where a particular biomarker quantity (e.g., protein expression, biomolecule concentration, biomarker completeness) has been evaluated. The tissue area summary value is used to normalize the biomarker quantity score(s) to enable assessment of biomarker quantity (e.g., total number of biomarker positive cells, biomarker staining area) relative to tissue context (e.g., biomarker positive cells per area total tissue area analyzed, staining area relative to total analyzed tissue area, biomarker positive cells per unit area of tumor epithelium tissue).

Previous methodologies focus on tissue area defined for a whole tissue section based on simple segmentation schemes or whole tissue annotations. These methodologies do not consider tissue object class within the image or tissue area analyzed for a particular biomarker. In an embodiment of this invention, the dataset that associates a quantity of a specific analyte or biomolecule at a specific location in a tissue object in the tissue section is processed to identify the subset of tissue objects of interest for biomarker expression analysis. Tissue area is then defined based only on the area occupied by the events of interest.

Figure 4A:
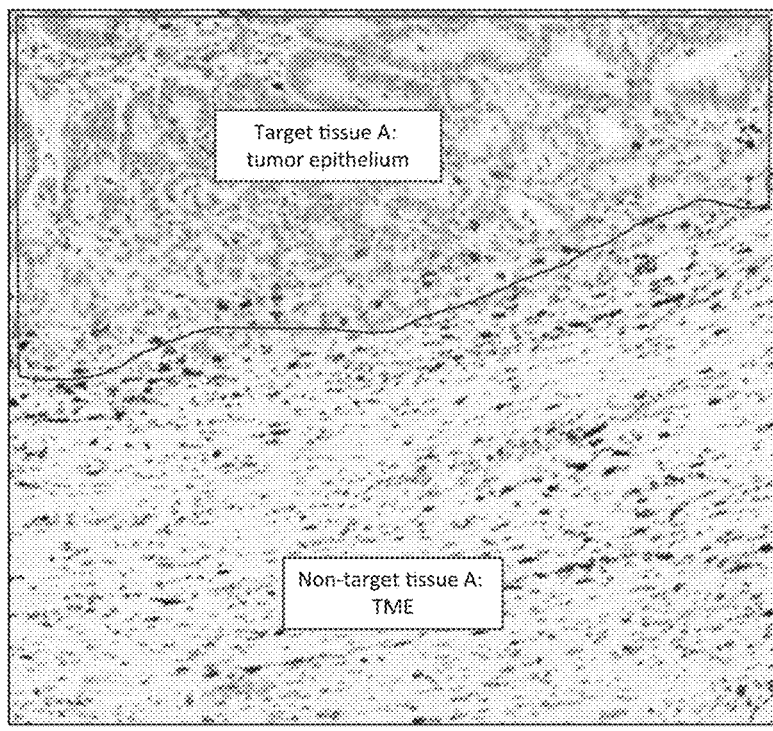
FIGS. 4(A-B) illustrate a pathological description of the tissue compartment of interest based on cell class in a tissue section which is defined as a "target tissue" for interrogation.
Figure 4B:
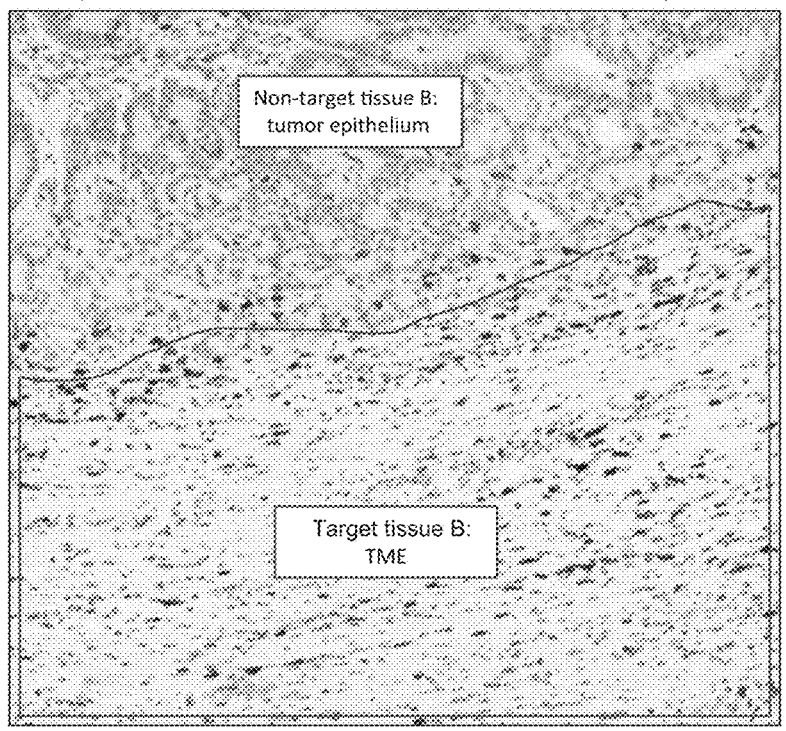

FIG. 4 illustrates this concept whereby two different tissue compartments, tumor epithelium and the adjacent tumor microenvironment (TME), are identified in an image of an IHC assay stained tissue. Analysis of biomarker expression (brown DAB staining) in each tissue compartment separately is of interest. In Example A, the tissue compartment comprised of tumor epithelium cells is the area of interest for analysis. In Example B, the tissue compartment comprised by the tumor microenvironment (stroma cells, stroma infiltrating lymphocytes, etc.), is the area of interest for analysis. Therefore, it is of interest to summarize biomarker staining (e.g., biomarker positive cells, average intensity of biomarker staining) in the context of the tissue area analyzed (e.g., biomarker positive cells per area of tumor epithelium analyzed).

The method described by the present invention defines tissue area relative to the context of the tissue. In another embodiment of the invention, tissue area is defined by one or more subsets or classes of tissue objects which define the class of objects of interest for biomarker analysis. Tissue objects are selected based upon one or more image analysis features which describes the class of objects. Tissue area is then determined only for the tissue area occupied by the tissue objects of interest for analysis.

Tissue object classes can be selected to define tissue area of interest for analysis in another embodiment of this invention. In this embodiment, tissue objects are classified into two or more classes (e.g., tumor epithelium, stroma, infiltrating lymphocytes) to define areas within the tissue section. Tissue objects are classified based on image analysis features which can be one or more of morphometric, biomarker expression, and localization features extracted by the image analysis algorithm process. Individual tissue objects can be classified based on image analysis features specific to the object itself, and can also be classified based on summary image analysis feature values for the surrounding objects (e.g., the neighborhood).

For example, and not limitation, a 'tumor cell' class can be identified based on a combination of one or more morphometric, biomarker expression, and location features by applying cell selection gates to the one or more features. In another example, tumor epithelium clusters and infiltrating lymphocytes can be classified based upon the surrounding cell objects and the resulting local summary of image analysis features. In the present invention, objects of interest for analysis, and definition of the corresponding tissue area, can be determined for object orientation spanning from diffuse orientation of objects (e.g., lymphocytes diffusely scattered in a tissue section) to clusters of similar objects (e.g., tumor epithelium clusters forming a tumor nest).

Figure 5:
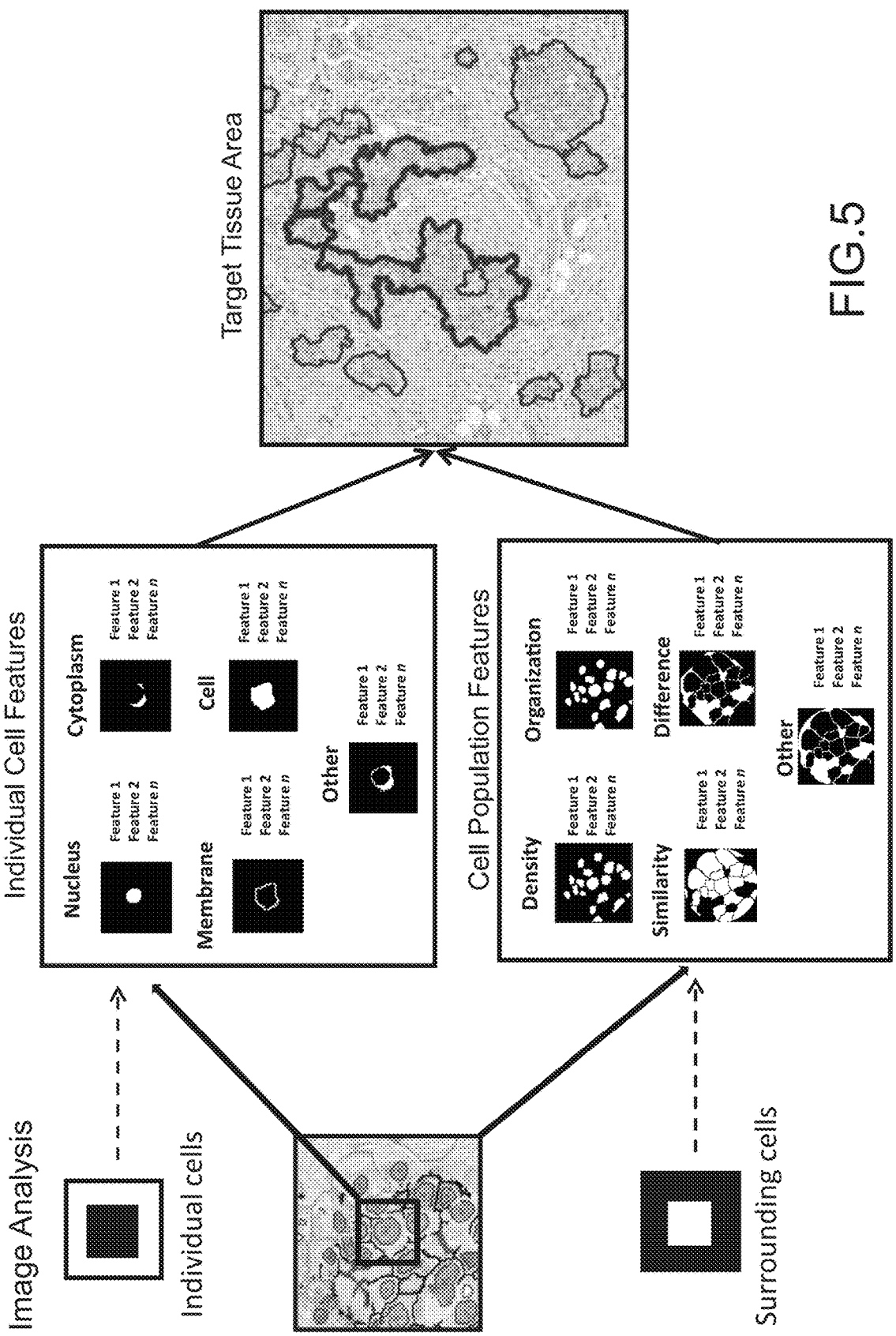
FIG. 5 demonstrates the embodied method for determining "target tissue area" based on the definition of cellular features to define the "target tissue".

FIG. 5 provides an illustrative example of tissue object class determination in the context of this invention. Individual tissue objects, cells in this example, are described by a plurality of image analysis features and one or more features are evaluated to define a target cell class of interest for analysis, tumor cells in this example. The image analysis features can describe the cell as a whole and cell sub-compartments such as the nucleus, cytoplasm, and membrane. In addition, each object can be described by a summary of the objects around it. Image analysis features pertaining to the density, organization, similarity, and difference of objects surround each object are extracted and can be evaluated to classify cell objects. In this example, both individual cell features and cell population features of those cells surrounding each cell are evaluated to classify cells as target tissue or non-target tissue. A region is then defined around the cell class defined as the target tissue for analysis. A tissue area value is extracted from this region.

In one embodiment of the invention, regions can be digitally defined around tissue object classes of interest for analysis to define tissue area. In this embodiment, tissue area is derived as a function of the tissue objects encompassed by the digitally defined region boarder or annotation. Additionally, exclusion regions defined by tissue object classes can also be added to exclude regions from analysis as tissue area.

In another embodiment of this invention, tissue area can be defined by the summed area of tissue objects classified as the tissue object class of interest for analysis. In this embodiment of the invention, tissue area is defined as a function of the number and size of image objects classified as the class of interest. Tissue area can be determined by summing object size for all objects of a specific class, or tissue area can be determined as a function (e.g., multiplication) of the total number of objects of a specific class and an average size for said objects.

Figure 6A:
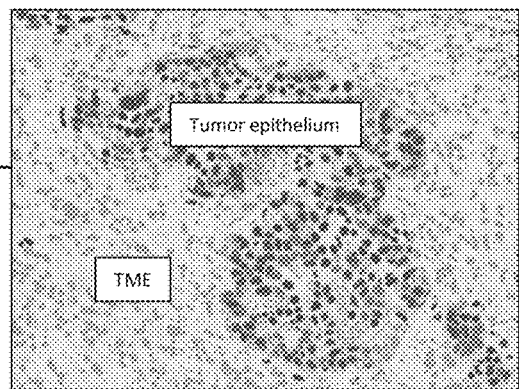
FIGS. 6(A-C) demonstrate two general definitions of "target tissue area" which are derived from the embodied methods.
Figure 6B:
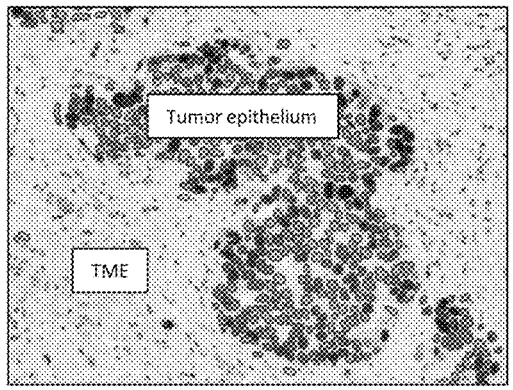
Figure 6C:
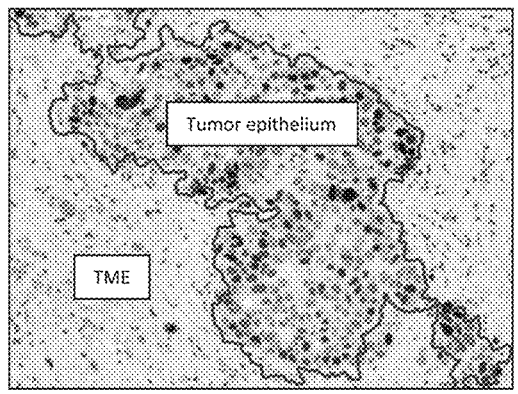

FIGS. 6(A-C) provides an example of these embodiments of the invention. FIG. 6A illustrates the classification of tissue objects, cells, into target tissue (e.g., tumor epithelium) and non-target tissue (e.g., TME) objects. In FIG. 6B, tissue area is determined by summing the individual cell areas for each cell classified as target tissue. In FIG. 6C, tissue area is determined by digitally defining a region around the target tissue objects and determining area included within the defined region.

Figure 7:
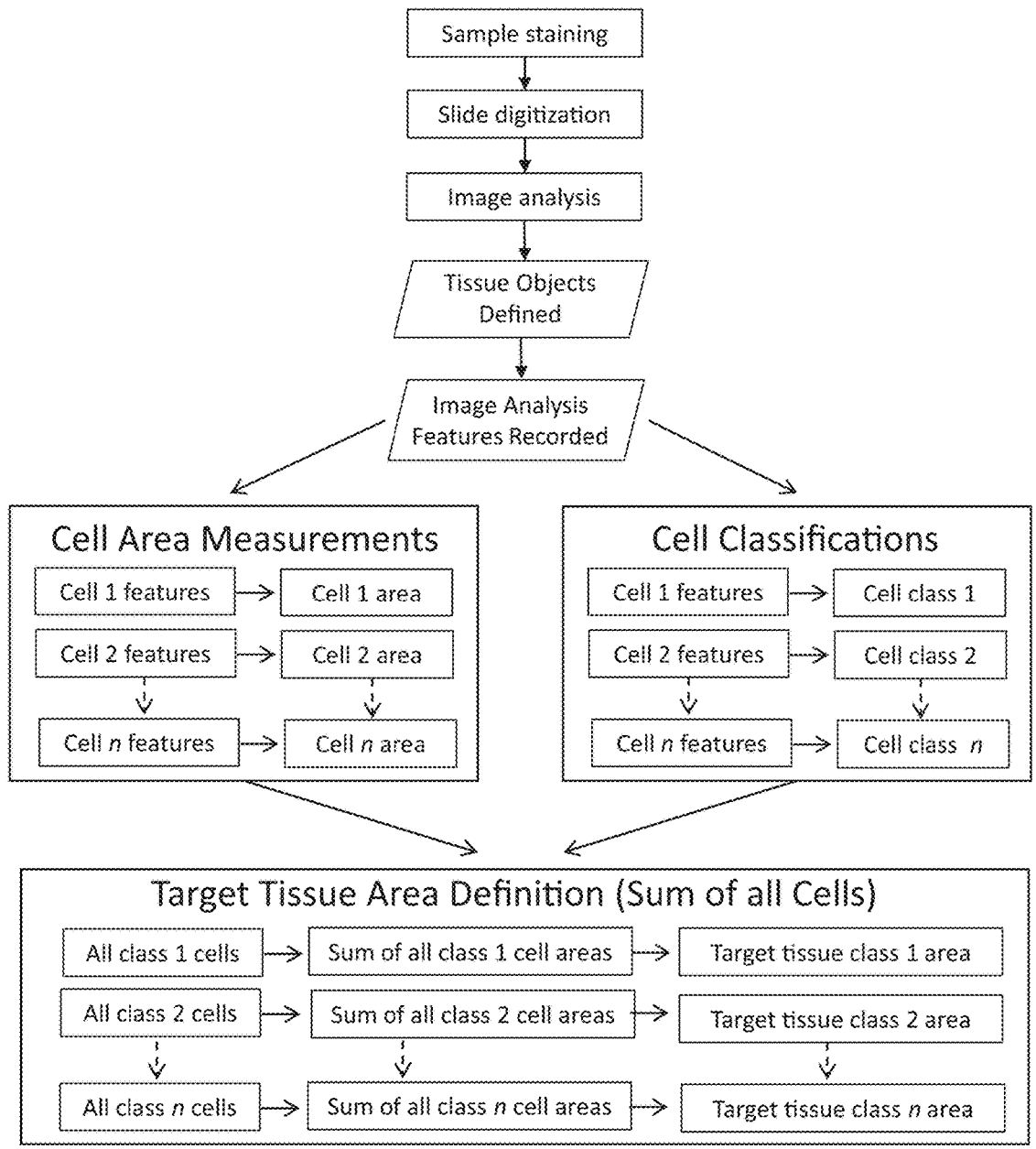
FIG. 7 illustrates the method of determining "target tissue area" utilizing the sum of all cell areas in the target tissue.

FIG. 7 provides a further example of the embodiment of the invention whereby tissue area is determined by the sum of tissue objects (e.g., cells) of a specific class. A tissue sample is analyzed by an algorithm process to define cell objects and to record the image analysis features describing each cell object. Each cell is classified and has its area determined by processing of one or more image analysis features, and the target tissue area is defined by summing all cell objects of a selected class.

Figure 8:
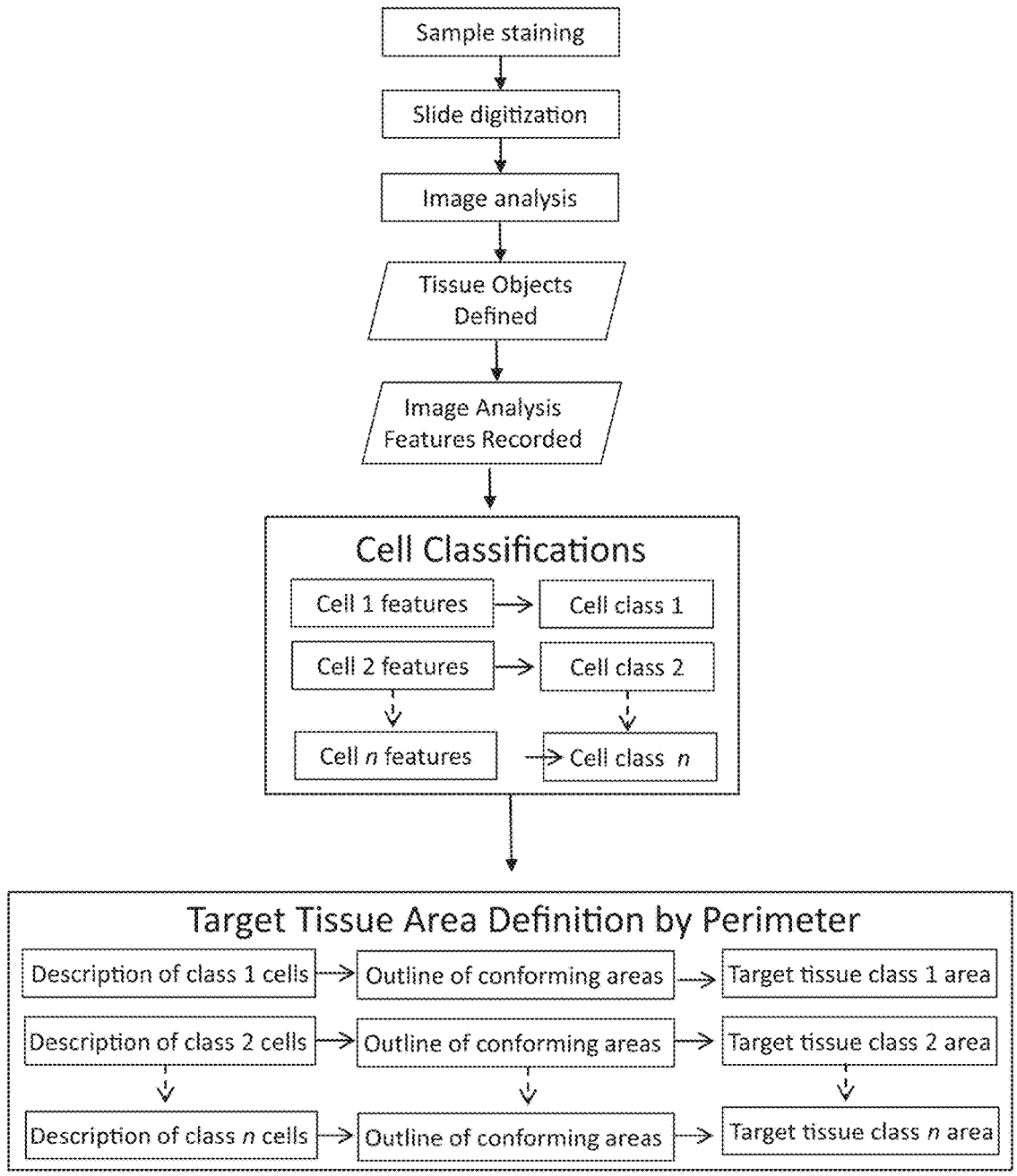
FIG. 8 illustrates the method of determining "target tissue area" by defining a region around object classes defined as "target tissue area" and utilizes the perimeter approach.

FIG. 8 provides a further example of the embodiment of the invention whereby tissue area is determined by defining a region around cell objects of a selected class. A tissue is similarly analyzed by an algorithm process to identify cell objects and to record their associated image analysis features. Each cell is classified based on one or more image analysis features and a perimeter is defined around groups of selected cell class(s). Tissue area is determined by analyzing the area enclosed by the one or more perimeters defined around selected cell class(s).

Figure 9:
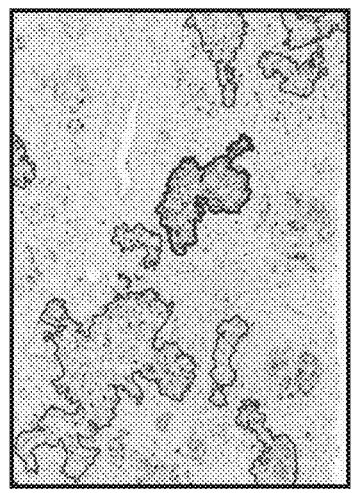
FIG. 9 provides examples of visual outcomes for the definition of "target tissue area", depending on the cell classification approach utilized.
Figure 9:
Figure 9:
Figure 9:
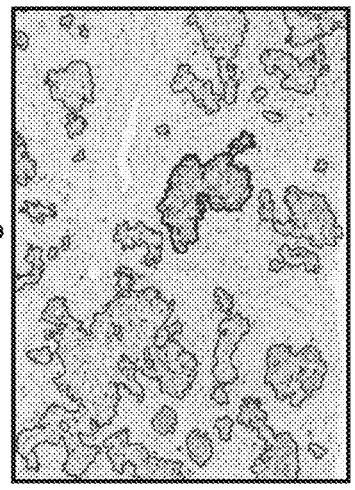
Figure 9:
Figure 9:
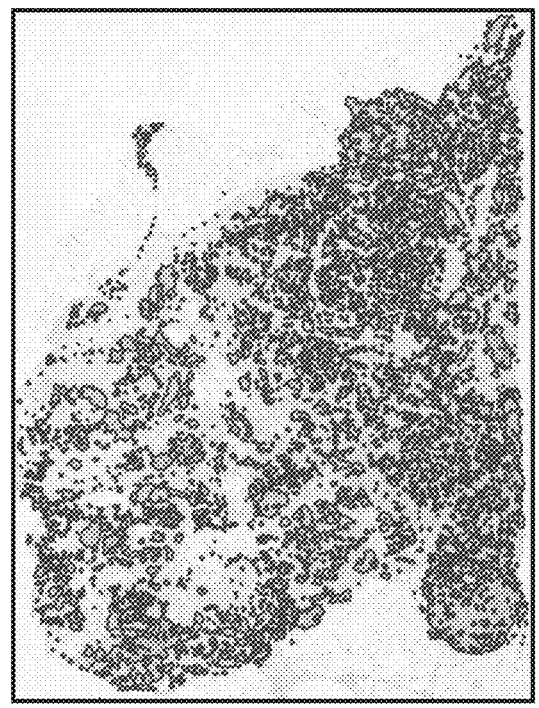

FIG. 9 provides an example of regions defined for the same tissue section evaluated based on two cell classification schemes. Cell classification type 1 includes all tumor epithelium cells as the cell class of interest for analysis. Regions are defined around the tumor epithelium class cells, and regions include both large and small clusters of tumor epithelium class cells. Cell classification type 2, in contrast, includes tumor epithelium cells in larger clusters only as the cell class of interest for analysis. Regions are defined only around those clusters of tumor epithelium cells which occur in larger tumor nest clusters.

Figure 10:
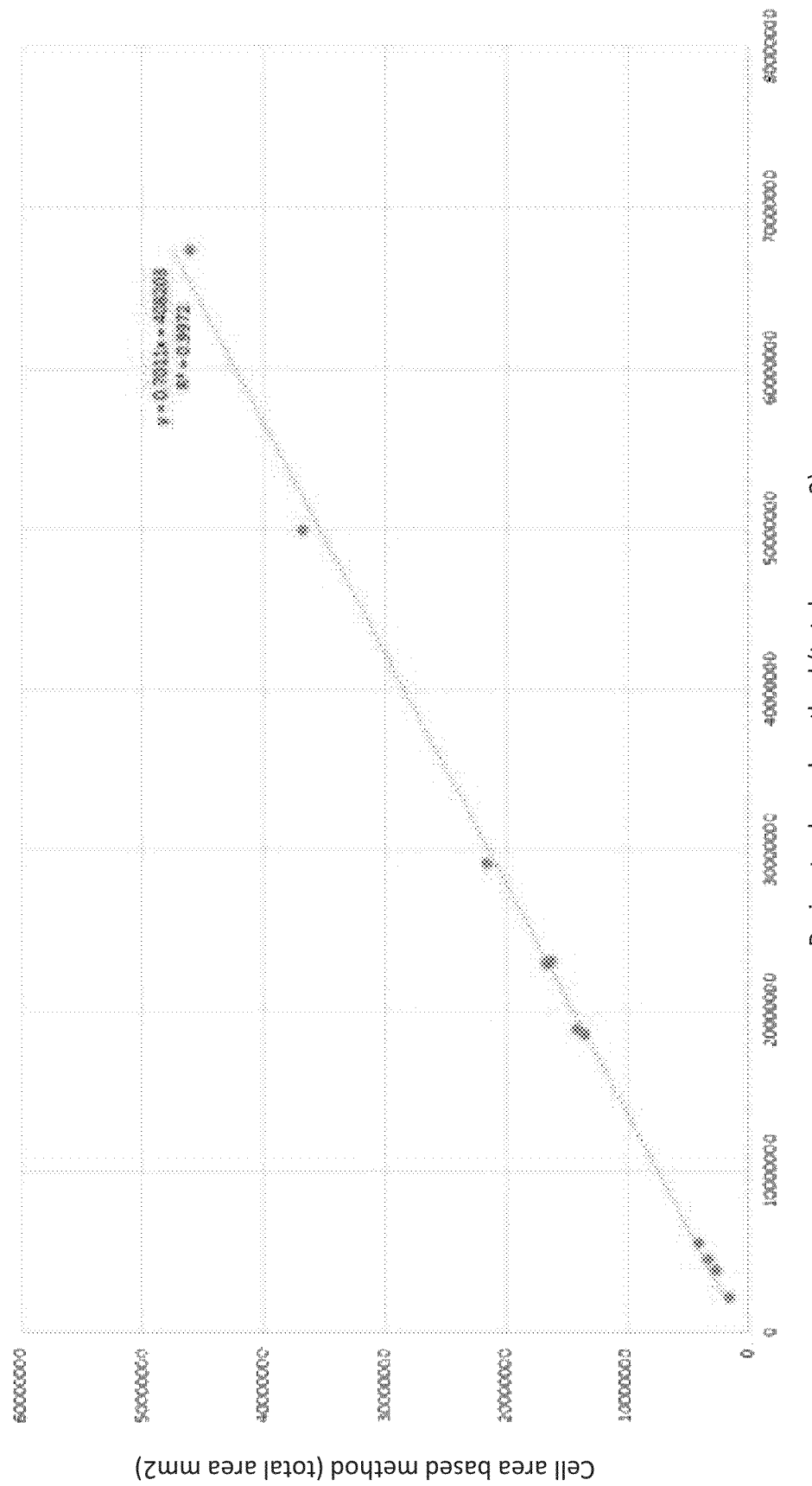
FIG. 10 provides a comparison of the results derived from the two "target tissue area" approaches.

FIG. 10 provides a comparison of two of the embodiments of this invention for defining tissue area; regions defined around cell classes of interest and summation of individual areas of the cells classified as the cell class of interest. The plot illustrates high correlation between the two embodiments for digitally defining tissue area based on classification of tissue objects.

What is claimed is:
1. A method comprising:
   acquiring at least one digital image of at least one tissue section assayed with a tissue-based assay;
   extracting image analysis features of tissue objects in the at least one digital image using a digital algorithm process;
   separating the tissue objects into at least one target class according to the extracted image analysis features;
   calculating an area of the at least target class;
   normalizing at least one biomarker expression quantity value within the at least one target class for the area of the at least one target class; and
   determining at least one patient status based on the at least one normalized biomarker expression quantity value.

2. The method of claim 1, wherein the image analysis features are selected from the group consisting of: morphometric features, staining features, and localization features.

3. The method of claim 2, wherein the morphometric features are selected from the group consisting of: size, shape, area, texture, organization, and organizational relationship.

4. The method of claim 2, wherein the staining features are selected from the group consisting of: stain appearance, stain intensity, stain completeness, stain shape, stain texture, and stain area.

5. The method of claim 2, wherein the localization features are selected from the group consisting of: position of a feature in the tissue section, spatial relationships of tissue objects relative to each other, and relationship of feature measurements between differential objects in the tissue section.

6. The method of claim 1, wherein the tissue-based assay is selected from the group consisting of: immunohistochemistry, immunofluorescent, chromogenic in situ hybridization, fluorescent in situ hybridization, and mass spectrometry imaging-based assay modalities.

7. The method of claim 1, wherein the at least one digital image is generated by an imaging modality selected from the group consisting of: bright-field, fluorescence, bright-field equivalent of fluorescence, and mass spectrometry imaging-based methods.

8. The method of claim 1, wherein the at least one digital image is contrived from a dataset which associates a specific biomolecule and its concentration at a specific location on a tissue section.

9. The method of claim 1, wherein the at least one target class relates to a biologically relevant tissue morphology based on shared image analysis features between the target class and the biologically relevant tissue morphology, wherein the biologically relevant tissue morphology is selected from the group consisting of gene product and tissue phenotype.

10. The method of claim 1, wherein the at least one target class relates to a biologically relevant tissue morphology based on deductive processes utilizing the staining and morphometric characteristics, even in the absence of stains which specifically characterize these attributes, wherein the biologically relevant tissue morphology is selected from the group consisting of gene product and tissue phenotype.

11. The method of claim 1, wherein the at least one target class is relevant to a biologically relevant tissue morphology based on the shared pathological and staining characteristics defined by empirical rationale, wherein the biologically relevant tissue morphology is selected from the group consisting of gene product and tissue phenotype.

12. The method of claim 1, wherein the area of the target class is derived from the total sum of area of individual tissue objects.

13. The method of claim 1, wherein the area of the target class is calculated as a function of individual target class areas within the tissue section.

14. The method of claim 1, wherein the area of the target class is calculated as the area within a perimeter around the target class.

15. The method of claim 1, wherein the normalization is derived from at least two tissue sections.

16. The method of claim 15, wherein the normalization is derived from a mathematical derivation utilizing a plurality of tissue sections.

17. The method of claim 1, wherein the at least one patient status is selected from the group consisting of diagnosis, disease severity, disease progression, and therapy efficacy.

18. The method of claim 1, wherein the at least one biomarker expression quantity value is the number of biomarker-positive tissue objects.

19. The method of claim 18, wherein the biomarker-positive tissue objects are biomarker-positive cells.

20. The method of claim 1, wherein the at least one biomarker expression quantity value is a number proportional to the total amount of biomarker expressed.

* * * * *